United States Patent [19]

Honecker

[11] 4,161,327

[45] Jul. 17, 1979

[54] STEERING ASSEMBLY FOR A VEHICLE, ESPECIALLY FOR AN INDUSTRIAL FLOOR VEHICLE, SUCH AS A FORKLIFT TRUCK

[75] Inventor: Günter Honecker, Klein-Welzheim, Fed. Rep. of Germany

[73] Assignee: Linde Aktiengesellschaft, Wiesbaden, Fed. Rep. of Germany

[21] Appl. No.: 836,849

[22] Filed: Sep. 26, 1977

[30] Foreign Application Priority Data

Sep. 24, 1976 [DE] Fed. Rep. of Germany ....... 2642903

[51] Int. Cl.² .............................................. B60G 1/00
[52] U.S. Cl. .................................. 280/95 R; 280/771
[58] Field of Search ..................... 280/95 R, 95 A, 93, 280/94, 771

[56] References Cited

U.S. PATENT DOCUMENTS

| | | | |
|---|---|---|---|
| 2,779,427 | 1/1957 | Lincoln et al. | 280/95 R X |
| 3,768,585 | 10/1973 | Matteo | 280/95 R X |
| 4,071,259 | 1/1978 | Ernest | 280/95 R |

*Primary Examiner*—Richard A. Bertsch
*Assistant Examiner*—Michael Mar
*Attorney, Agent, or Firm*—Karl F. Ross

[57] ABSTRACT

An axle assembly for steerable wheels of a vehicle, especially an industrial floor vehicle such as a forklift truck, is designed to permit a maximum steering displacement of the wheels by mounting the wheels on axle carriers pivotal upon an axle housing and displacing each of these carriers by a respective tie bar. The tie bars are pivotally connected to a central member which, in turn, is swingable upon the axle housing. Each of the tie bars has a substantially rectangular cross section and the two bars have the same bending strength and stiffness in the plane of the bars perpendicular to the axes at which the bars are pivoted to the common central member independently and to the respective axle carriers.

7 Claims, 4 Drawing Figures

STEERING ASSEMBLY FOR A VEHICLE, ESPECIALLY FOR AN INDUSTRIAL FLOOR VEHICLE, SUCH AS A FORKLIFT TRUCK

CROSS-REFERENCE TO RELATED APPLICATIONS

This application is related to commonly assigned copending concurrently filed applications Ser. No. 836,847, Ser. No. 847,850 and Ser. No. 836,851.

FIELD OF THE INVENTION

The present invention relates to an axle assembly for a vehicle and, more particularly, an axle assembly for the steerable wheels of a floor or industrial vehicle such as a forklift truck.

BACKGROUND OF THE INVENTION

In floor and industrial vehicles such as forklift trucks, a high degree of maneuverability is essential to allow the vehicle to operate most effectively in small spaces. One of the requisites of such high maneuverability is an extremely small turning radius and this, of course, requires that the steering assembly for the vehicle permit a maximum angular displacement of each of the steerable wheels.

While steering assemblies which permit such high degrees of maneuverability and large-angle displacement of the wheels are known, they generally require complex mechanisms of relatively large size, two disadvantages for such industrial vehicles.

OBJECT OF THE INVENTION

It is the object of the present invention to provide a relatively simple and low-cost axle assembly for the steerable of a vehicle, especially a floor or industrial vehicle such as a forklift truck, which permits a large angular displacement of the steerable wheels in an assembly of relatively small height.

SUMMARY OF THE INVENTION

This object is attained, in accordance with the present invention, by providing the axle assembly for the steerable wheels of the industrial vehicle, namely the forklift truck, such that an axle housing connects the pivots of a pair of axle carriers, each of which carries the hub of a respective wheel while centrally in this housing there is provided a pivot pin upon which a central member or knuckle is swingable.

The central member is connected with each of these carriers by a respective tie bar so that each tie bar is independently pivoted to the central member and to the respective axle carrier. According to the invention, the individual tie bars are of substantially rectangular cross section and constitute mechanical members of identical bending strength or stiffness between the central member and the respective axle carrier.

The term "substantially rectangular" is here used to mean both rectangular in the strictest sense, i.e. defined between four sides having mutual right angles and with opposite sides parallel to one another, and a substantially elliptical profile with the long sides of the elliptical cross section corresponding to the long sides of a rectangular cross section. In other words, a rectangle with radius corners or rounded corners is "substantially rectangular" within the definition given above.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
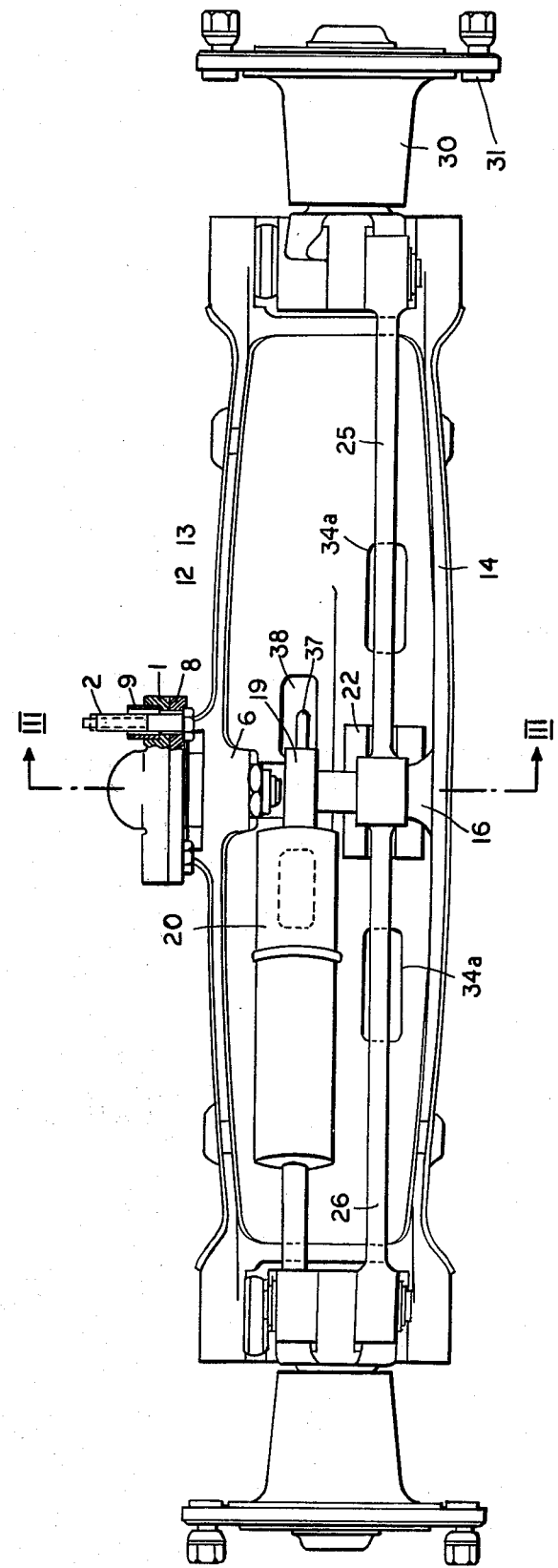
FIG. 1 is an elevational view of an axle assembly for the steerable wheels of a forklift truck as seen from the rear, partly broken away.

The axle assembly shown in FIGS. 1 through 4 is intended to be mounted upon the frame or chassis of a forklift truck or like industrial vehicle, the frame or chassis being unillustrated in the drawing.

More specifically, the axle assembly comprises a pair of mounting plates 1 which are intended to be affixed to the frame, not shown, of the vehicle. Each of the mounting plates 1 is formed with a ball-shaped receptacle 1a (see FIGS. 2 and 3) in which a ball head 3 is received. Each of the ball heads 3 has a pin 4 which extends through a projection 5 or 6 of the axle housing and is fixed thereto by a nut 7.

To prevent the ball heads 3 from pulling out of the sockets 1a of the mounting plates 1, below these ball heads there are provided form-fitting securing plates 8 which pass the ball members with clearance and are affixed from below to the vehicle frame. Stressing sleeves 9 ensure a firm connection between members 1 and 8. An elastic ring is disposed between each of the plates 8 and the housing lugs 5 and 6 to form a seal around the balls 3 as shown at 10 in FIG. 3.

The axle housing, which is formed with the forward projecting or lug 5 and the rearward projection or lug 6 previously mentioned, is represented generally at 100 and comprises an upper horizontal wall 12, a rear wall 13 and a lower wall 14. One side of the housing is thus open at 100a.

The rear wall 13 is formed at its lower central portion with an outward bulge 13a. In the vertical median plane through the housing, corresponding to the plane of the section line III — III, the upper wall 12 is formed with a downwardly extending boss 15 while the bottom wall 14 is formed with an upwardly extending boss 16. These bosses 15 and 16 are formed with aligned bores 17 into which a pivot pin 18 is press-fitted.

A pivot head 19 of a hydraulic cylinder 20, serving to displace the steering mechanisms, is swingably mounted upon the pin 18.

Below the head 19, also upon this pin 18, there is provided a spacing sleeve 21 and, below the spacing sleeve, the pivot head 22a of a steering knuckle or central member 22.

In the central member 22, by respective pivots 23 and 24, two tie bars 25 and 26 are mounted.

The tie bar 25 is pivotally connected by a pin 29 to an axle carrier 28a upon which the right-hand axle 28 is affixed. The axle carrier 28a is pivotally connected by a pin 27 to the right-hand end of the axle housing 100. The axle 28, in addition, carries the wheel hub 30 to which, by screws 31, the felly or rim of the right-hand wheel can be affixed.

Similarly, the axle 32 carrying the hub 30 and the wheel bolts for the left-hand wheel is mounted upon an axle carrier which is pivoted at 27 to the housing and is connected by a pivot bolt or pin 33 with the tie bar 26.

The bolt or pin 33 is made somewhat longer than the bolt or pin 29 to accommodate the pivot head of the rod 35 of the hydraulic cylinder 20. Thus the hydraulic cylinder 20 acts upon the carrier for the left-hand wheel as can be seen from FIG. 2.

The working chamber on the piston-rod side of this cylinder is connected to a line 36 which can be pressurized by any conventional steering control (not shown) for the forklift truck. The working chamber of the cylinder at the piston side is connected via a bore 36a with a line 37 passing through a window 38 in the rear wall 13 of the axle housing 100.

The rear wall 13 is also formed with cutouts 34a to permit full displacement of the tie rods 25 and 26 and thus prevent these rod members from contacting the wall 13.

The axes of the pivot pins or bolts 18, 23, 24, 27, 29 and 33 are all parallel to one another, generally perpendicular to the walls 12 and 14 and substantially parallel to the wall 13. They are also substantially perpendicular to the plane of the tie bars 25 and 26.

Figure 4:
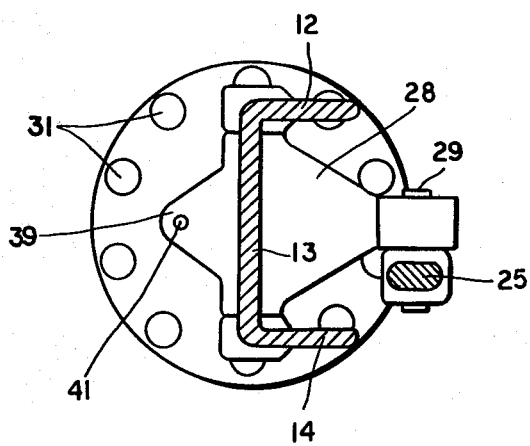
FIG. 4 is a cross-sectional view taken along the line IV — IV of FIG. 2.

As can be seen especially from FIG. 4, the tie bars 25 and 26 are of substantially rectangular cross section and constitute bodies of identical bending strength and stiffness. This has been found to be essential for effective utilization of the axle assembly of the present invention.

Each of the axle carriers 28a, 32a is provided with a projection 39 in which an adjusting screw 41 is threaded and locked in place by a counternut 40. The screw 41 sets the maximum angular displacement of the respective axle carriers about the pivots 27 and thus prevents the tires carried by the respective wheels from coming to rest against the rear wall 13 or, in the opposite direction, against the hydraulic cylinder 20.

Figure 2:
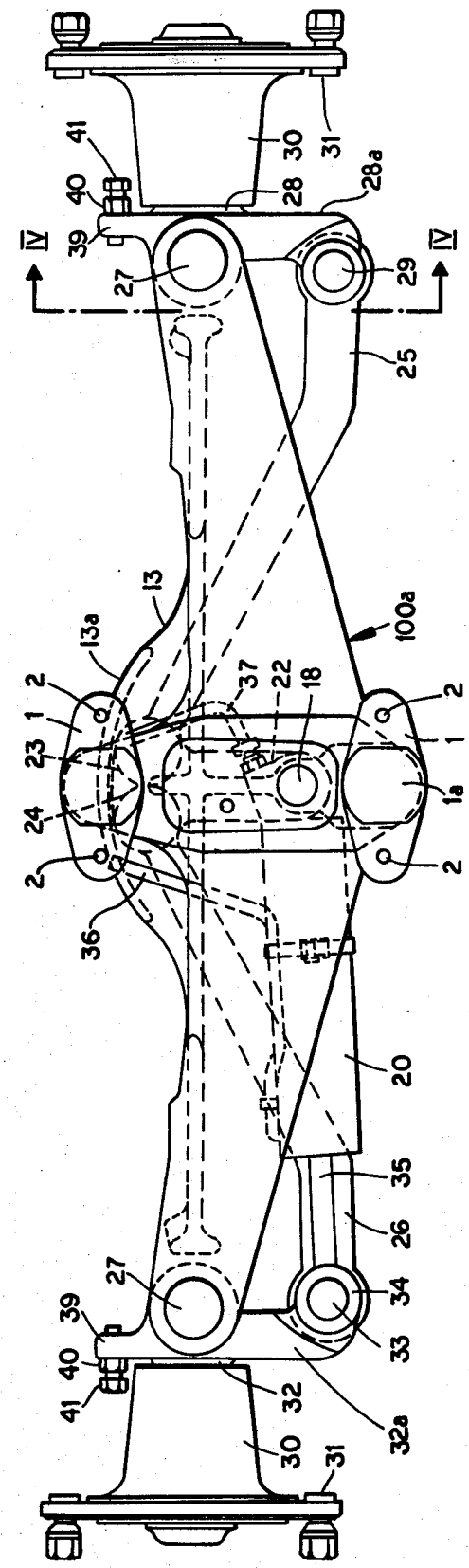
FIG. 2 is a plan view of the axle assembly.

It is important, as noted, that the members 25 and 26 have the same bending strength and stiffness in a plane corresponding to the plane of FIG. 2 and perpendicular to the plane of FIG. 1.

Figure 3:
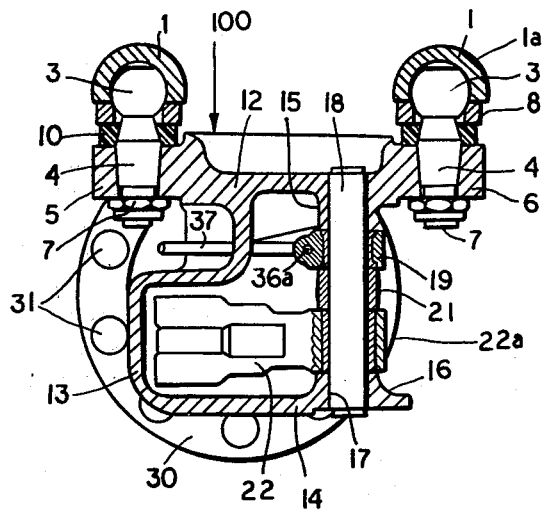
FIG. 3 is a cross-sectional view taken along the line III — III of FIG. 1.

As can be seen from FIGS. 2 and 3 of the drawing, the centers of the ball joints formed by the balls 3 lie in a vertical plane through the axis of the shaft or pin 18 and define a line which is perpendicular to this pin 18. Furthermore, the pin 18 forms a common element supporting the knuckle 22 and the head 19 at the end of the cylinder 20 so that the pivots for the cylinder and for the knuckle are coaxial.

I claim:

1. A wheel assembly for a vehicle, especially a floor vehicle such as a forklift truck, which comprises:
   an elongated axle housing;
   a respective axle carrier pivotally mounted at each end of said housing for steering displacement of a wheel carried on the respective carrier;
   a pivot pin mounted in said housing centrally of said ends;
   a steering knuckle swingably mounted on said pin; and
   a pair of flat, coplanar tie bars individually pivoted to said knuckle and respectively articulated to said carriers, said tie bars being angularly bent in their common plane and having a substantially rectangular cross section progressively narrowing from their bends in the direction of said knuckle.

2. The steering assembly defined in claim 1 wherein the pivots between said carriers and said housing, the pivots between said carriers and the respective tie bars, the pivots of the respective tie bars on said steering knuckle and said pin all have mutually parallel axes.

3. A wheel assembly for a vehicle, especially a floor vehicle such as a forklift truck, which comprises:
   an elongated axle housing;
   a respective axle carrier pivotally mounted at each end of said housing for steering displacement of a wheel carried on the respective carrier;
   a pivot pin mounted in said housing centrally of said ends;
   a steering knuckle swingably mounted on said pin; and
   respective tie bars individually pivoted to said knuckle and pivotally connected to the respective carriers, said tie bars being of substantially rectangular cross section and the same bending strength and rigidity, the pivots between said carriers and said housing, the pivots between said carriers and the respective tie bars, the pivots of the respective tie bars on said steering knuckle and said pin all having mutually parallel axes, said housing being of generally rectangular cross section and comprising an upper horizontal wall, a rear wall and a lower horizontal wall, said rear wall having a bulge accommodating said knuckle and the pivots for said bars thereon, said pin being disposed between said upper and lower walls opposite said bulge, said upper and lower walls being formed with bosses receiving said pin.

4. The steering assembly defined in claim 3, further comprising a hydraulic cylinder swingably mounted on said pin and linked with said knuckle, said cylinder having a piston rod pivotally connected to one of said carriers on a common pivot with the respective tie bar.

5. The steering assembly defined in claim 4 wherein each of said carriers is provided with a projection and an adjusting screw threaded into said projection and held therein by a counternut for limiting the angular displacement of the respective carrier relative to said housing.

6. The steering assembly defined in claim 5 wherein said upper wall of said housing is formed with a pair of oppositely extending lugs each of which is formed with a respective ball, and means for connecting said balls to the chassis of said vehicle.

7. The steering assembly defined in claim 6 wherein said wall formed with said bulge is provided with cutouts adapted to clear said tie bars.

* * * * *